United States Patent [19]

Takada et al.

[11] 4,276,745
[45] Jul. 7, 1981

[54] EXHAUST GAS CONTROL APPARATUS

[75] Inventors: Shigetaka Takada, Ohbu; Kazumichi Naruse; Yukihiro Watanabe, both of Nagoya, all of Japan

[73] Assignee: Aisan Industry Co., Ltd., Aichi, Japan

[21] Appl. No.: 56,759

[22] Filed: Jul. 12, 1979

[51] Int. Cl.³ .............................................. F01N 3/10
[52] U.S. Cl. ...................................... 60/276; 60/289; 60/307; 417/471
[58] Field of Search ............... 417/471; 60/307, 276, 60/290, 289

[56] References Cited

U.S. PATENT DOCUMENTS

| | | | |
|---|---|---|---|
| 1,883,459 | 10/1932 | Avigdor | 417/471 |
| 3,203,168 | 8/1965 | Thomas | 60/286 |
| 3,986,352 | 10/1976 | Casey | 60/289 |
| 4,068,472 | 1/1978 | Takata | 60/290 |
| 4,099,377 | 7/1978 | Yoshimura | 60/289 |
| 4,149,376 | 4/1979 | Masaki | 60/290 |

FOREIGN PATENT DOCUMENTS 52-18519 2/1977 Japan ........................................ 60/307

*Primary Examiner*—Douglas Hart

[57] ABSTRACT

An improved exhaust gas control apparatus, which utilizes a 3-way catalyst for reducing the contents of harmful components in exhaust gas, incorporates a diaphragm type air pump for supplying secondary air, upstream of the catalyst, to the exhaust gas. A chamber, which is formed on one side of the diaphragm in the air pump, is communicated through an electromagnetic changeover valve with the upstream side of the catalyst.

9 Claims, 2 Drawing Figures

EXHAUST GAS CONTROL APPARATUS

BACKGROUND OF THE INVENTION

This invention relates to an apparatus for controlling exhaust gas discharged from an internal combustion engine, and more particularly to an apparatus which is used for control of the exhaust gas in a closed loop in which the air-fuel ratio of the gas mix in the carburetor is so controlled by means of signals from an exhaust gas sensor that the air-fuel ratio is always maintained close to a theoretical air-fuel ratio in order to effectively utilize a (exhaust gas purification) cleaning function of a 3-way catalyst, and which is adapted to supply, during the idle mode and during the cold mode of the engine, secondary air to the gas mix in a region between the exhaust gas sensor and the 3-way catalyst.

The 3-way catalyst has been used as means for simultaneously reducing the contents of three harmful components, NOx, HC and CO contained in the exhaust gas discharge from internal combustion engines. For utilizing the 3-way catalyst in the most efficient manner, it is necessary to precisely control the air-fuel ratio of the gas mix being supplied to an engine so that the air-fuel ratio of the gas mix may be maintained as close to the theoretical air-fuel ratio as possible. For this purpose, an air-fuel ratio control apparatus of feedback type has been developed. With this conventional control apparatus, however, there are some cases where the cleaning function of the 3-way catalyst cannot be effectively obtained. For example, in the case of a transition from the idle mode to the acceleration mode or during the shifting of the gears, the control is unable to follow a rapid variation in the air-fuel ratio. In the case of a cold start or in the case of a long time idling, the temperature of the exhaust gas sensor decreases resulting in an increased internal impedance, thus making the normal control impossible to be obtained. As a result, large amounts of the harmful components, especially CO, may be discharged in the air. For preventing this, a system has been proposed wherein, at the time of idle or gear shift, for example, secondary air is supplied upstream of the 3-way catalyst to the exhaust gas to dilute the gas so that the 3-way catalyst can function in an oxidizing region, thereby to effectively eliminate CO. As means for supplying such secondary air, an air supply device, which comprises an air pump of a vane type and an electromagnetic three-way valve, has been employed. In this system, however, since the air pump is driven through rotation of the engine, a part of the output of the engine is consumed in the air pump, resulting in a decreased effective output of engine. Especially in a region of the running mode which requires the maximum output, a decrease in the effective output is significant because of an increased pressure of the exhaust gas and an increased load put on the air pump.

SUMMARY OF THE INVENTION

The invention has been accomplished because of the above-described problems in the prior art.

Accordingly, an object of the invention is to provide an improved exhaust gas control apparatus.

According to the invention, an air supply device is communicated with a chamber, which is formed on one side of the diaphragm in a diaphragm type fuel pump, through an air intake port and an air discharge port communicating with the chamber, the diaphragm being driven by a rocker arm in an interlocked manner with the drive shaft of engine. The air discharge port is communicated through an electromagnetic valve to the upstream side of 3-way catalyst. With such diaphragm type air pump, secondary air can be supplied to the exhaust gas to reduce discharged amounts of CO without causing a decrease in the output of the engine, as compared with the conventional vane type air pump.

The above and other objects, features and advantages of the invention will become apparent from the following detailed description of a preferred embodiment thereof made in connection with the accompanying drawings.

DETAILED DESCRIPTION OF THE PREFERRED EMBODIMENT

Figure 1:
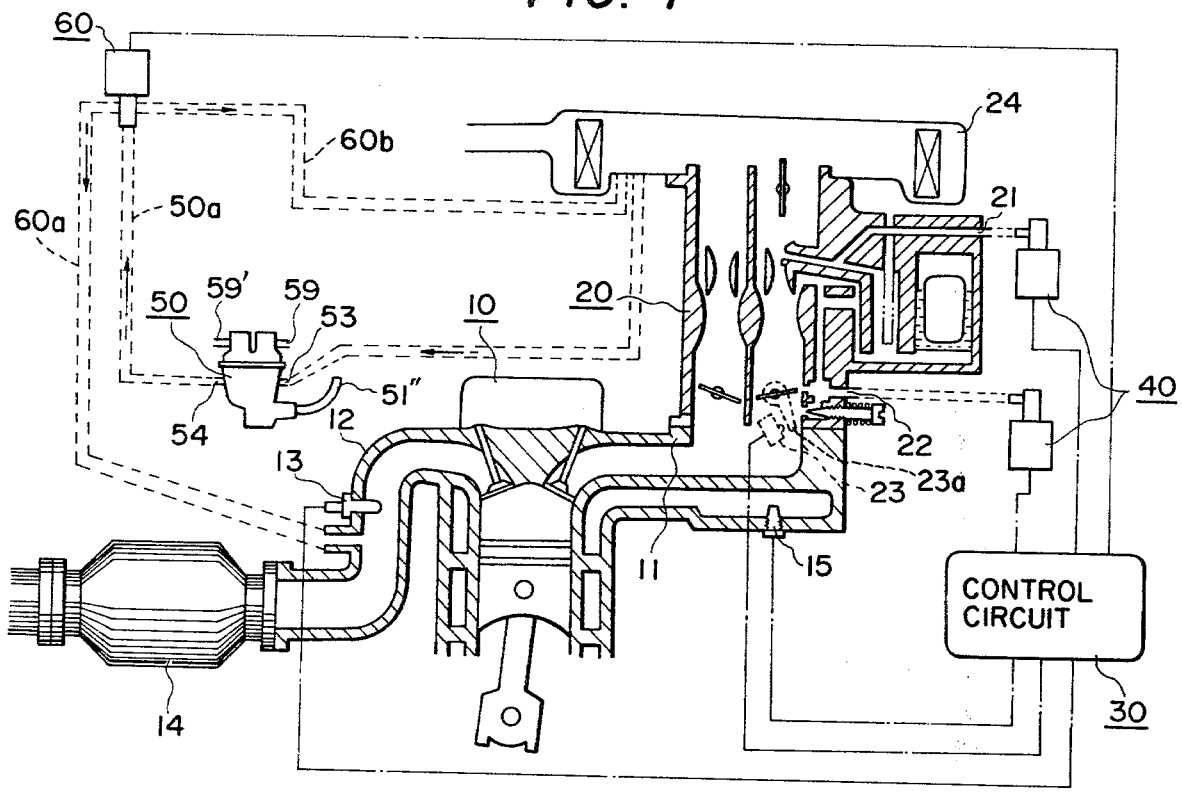
FIG. 1 schematically shows, partially in section, an exhaust gas control system according to the invention.
Figure 2:
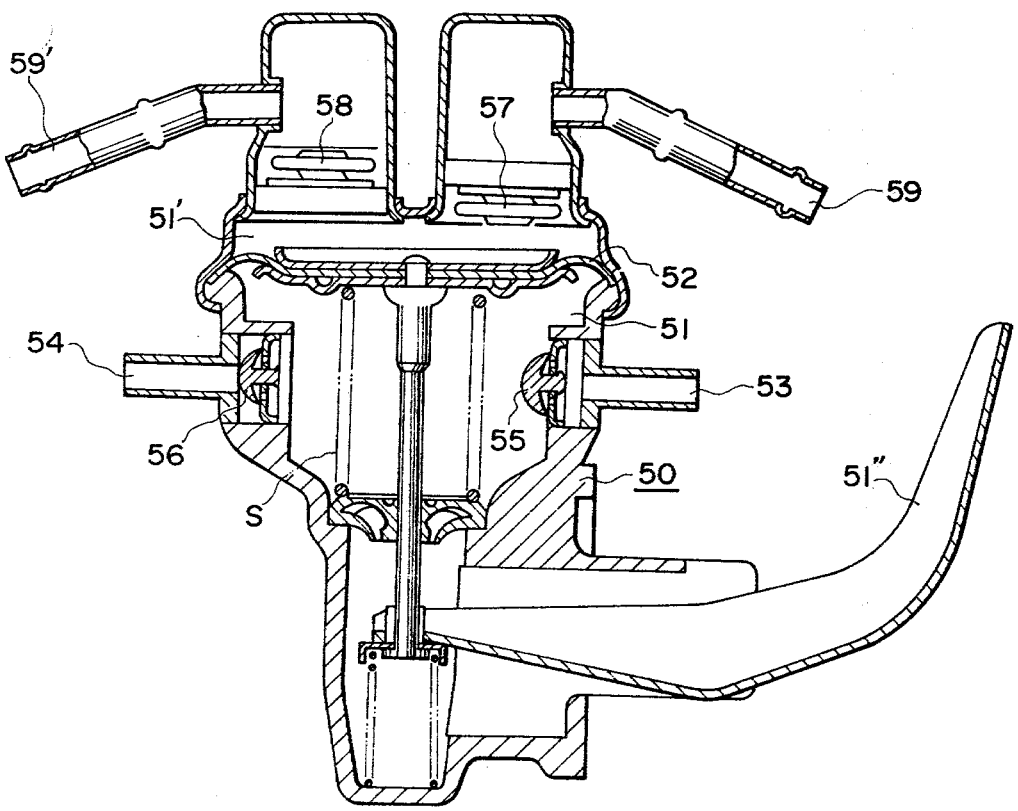
FIG. 2 is a sectional view of a diaphragm type air pump used in the system of FIG. 1.

The invention will now be described in connection with a preferred embodiment thereof while making reference to the drawings. Referring now to FIG. 1 which illustrates an embodiment of the invention, there are shown an engine 10, a suction manifold 11 thereto, an exhaust manifold 12 therefrom, an exhaust gas sensor 13 disposed in the latter, and portion containing a 3-way catalyst 14 communicating with the exhaust gas manifold 11. A water temperature switch 15 is provided in the water jacket of the engine. A carburetor 20 has an air bleed control port 21 for a main metering system, and an air bleed control port 22 for a slow speed system. An idling detection switch 23 is provided which cooperates with a switch member mounted jointly to the throttle valve, an air cleaner 24 communicates with the intake passage of the carburetor. A control circuit 30 is connected to the exhaust gas sensor 13 and to actuators 40 and to an electromagnetic change-over valve 60 which is connected to a diaphragm type air pump 50. FIG. 2 illustrates in detail the construction of the diaphragm type air pump 50. Referring now to FIG. 2, on one side of a diaphragm 52 is formed a diaphragm chamber 51, and, on the other side of the diaphragm 52 is formed a fuel chamber 51'. The diaphragm chamber 51 has an air intake port 53 and an air discharge port 54 which are provided with a bevel valve 55 and a bevel valve 56, respectively. The fuel chamber 51' is communicated with a fuel intake port 59 through a check valve 57, and with a fuel discharge port 59' through a check valve 58. The numeral 51' indicates a rocker arm.

Normally, the control circuit 30 actuates, due to signals given from the exhaust gas sensor 13, the actuators 40 for controlling amounts of bleed airs in the main metering system and in the slow speed system, thereby controlling the air-fuel ratio of the gas mix, which is to be supplied to the engine 10, so that air-fuel ratio of the gas mix may be maintained close to the theoretical air-fuel ratio, while the 3-way characteristic of the 3-way catalyst 14 is utilized for effectively reducing discharged amounts of the three harmful components NOx, CO and HC.

When the rocker arm 51" is pushed by a cam (not shown) driven by the drive shaft of the engine, the diaphragm 52 is moved downwardly, and fuel is introduced from the fuel intake port 59, passes through the check valve 57, which is provided on the fuel inlet, and flows into the fuel chamber 51'. At the same time, the bevel valve 55, which is provided on the air intake port, is closed, and thus air in the diaphragm chamber 51 is compressed and is discharged out therefrom by forcing the bevel valve 56, which is provided on the air discharge port, to open. When the locker arm 51" is released from the cam, the diaphragm 52 is moved upward by a diaphragm spring S, pressure of the fuel in the fuel chamber 51' is increased and the fuel is discharged from the fuel discharged port 59' through the check valve 58 which is provided on the fuel outlet. At the same time, pressure in the diaphragm chamber 51 becomes negative, the bevel valve 56, which is provided on the air discharge port, is closed, the bevel valve 55, which is provided on the air intake port, is opened, and air is introduced through the air intake port 53 into the diaphragm chamber 51. When a signal is applied from the water temperature switch 15 or the idling detection switch 23, the control circuit 30 applies an ON/OFF signal to the electromagnetic changeover switch 60. When the changeover valve 60 is turned to ON, air, which is sent therein from the air pump 50 via conduit 50a, is sent to the upstream side of the 3-way catalyst 14 and conduit 60a. When the changeover valve 60 is turned to OFF, air, which is sent in there from the air pump 50 via conduit 50a, is sent to the air cleaner 24 via conduit 60b.

As will be apparent from the above description, according to the invention, secondary air is supplied, depending on the idling signal and the water temperature signal, to the upstream side of the 3-way catalyst for reducing the CO content, thus satisfactorily effecting the original performance of the catalyst, while allowing the air pump to perform its function without degrading the function of the conventional mechanical fuel pump. Accordingly, a large amount of surplus in output can be obtained with an apparatus which is smaller in size and lighter in weight as compared with the prior art apparatus; thus an increased loading capacity and a reduction in fuel cost is obtained. Further, cost can be reduced as compared with the conventional air pump.

While the invention has been described in connection with the preferred embodiment thereof, it should be understood that the invention is not limited to the above and various changes and modifications can be made without departing from the spirit and scope of the invention.

What is claimed is:

1. In an exhaust gas control apparatus having an exhaust gas sensor means, disposed in the exhaust system of an internal combustion engine having an engine shaft, for detecting the air-fuel ratio of an air-fuel mixture supplied to the engine, a carburetor supplying an air-fuel mixture to the engine having main and slow systems and an air cleaner upstream of the carburetor, temperature detector means for detecting a non-warm condition of the engine, actuator means disposed in the main and slow systems of the carburetor for controlling the air-fuel ratio of the mixture supplied to the engine, control circuit means for driving said actuator means in accordance with a signal from the exhaust gas sensor, a 3-way catalyst disposed in the exhaust system at a downstream side of said exhaust gas sensor, idle detector means for detecting an idle condition of the engine, an air supply means for supplying secondary air to the exhaust system at an upstream side of said 3-way catalyst in accordance with a signal from the temperature detector means for detecting the non-warm condition of the engine, the improvement wherein
said air supply means comprises a diaphragm type fuel pump means, having a diaphragm and a rocker arm operatively connected thereto, for being driven by the engine shaft via said rocker arm,
said detector means are connected to said control circuit means,
said air supply means defining a chamber at one side of the diaphragm and having an air inlet port and air discharge port communicating therewith,
change-over solenoid valve means for being driven by said control circuit means in accordance with signals from said detector means and for communicating therethrough said air discharge port with the upstream side of the 3-way catalyst and the air cleaner respectively.

2. The exhaust gas control apparatus according to claim 1, wherein
said diaphragm type fuel pump means includes,
a displaceable rod connected at one end to said diaphragm and at another end to said rocker and constituting means for moving said diaphragm, another chamber being defined at the other side of the diaphragm and having a fuel intake port and a fuel discharge port communicating therewith,
oppositely acting check valves disposed in said another chamber and communicating with said fuel intake port and said fuel discharge port, respectively.

3. The exhaust gas control apparatus according to claim 2, further comprising
oppositely acting bevel valves disposed in said first-mentioned chamber communicating with said air intake port and said air discharge port, respectively.

4. The exhaust gas control apparatus according to claims 1, 2 or 3, further comprising
spring means for biasing said diaphragm.

5. The exhaust gas control apparatus according to claim 2, further comprising
first spring means for biasing the said another end of said rod.

6. The exhaust gas control apparatus according to claim 1, wherein
said air supply means communicates with the exhaust system between the 3-way catalyst and the exhaust gas sensor means.

7. The exhaust gas control apparatus according to claim 1, wherein
said air intake port communicates with the air cleaner.

8. The exhaust gas control apparatus according to claim 1, wherein
said change-over solenoid valve means for switching over to connect said air discharge port with said upstream side of the 3-way catalyst when said temperature detector means detects the non-warm condition and said idle detector means detects the idle condition, respectively.

9. The exhaust gas control apparatus according to claim 1, further comprising
a throttle valve at the carburetor,
said temperature detector means is an engine water switch,
said idle detector means comprises a member connected jointly to said throttle valve and a switch cooperating with said member.

* * * * *

UNITED STATES PATENT AND TRADEMARK OFFICE
CERTIFICATE OF CORRECTION

PATENT NO. : 4,276,745
DATED : July 7, 1981
INVENTOR(S) : Shigetaka Takada et al It is certified that error appears in the above-identified patent and that said Letters Patent are hereby corrected as shown below:

Insert on the first page:

--[30] Foreign Application Priority Data

Aug. 7, 1978 [JP] Japan 95997/1978--

In Item [75]    delete "Ohbu" and change "both of Nagoya,"

to read --all of AICHI,--

Signed and Sealed this

Sixth Day of October 1981

[SEAL]

Attest:

GERALD J. MOSSINGHOFF

*Attesting Officer*    *Commissioner of Patents and Trademarks*